(12) United States Patent
Awano et al.

(10) Patent No.: US 9,743,286 B2
(45) Date of Patent: Aug. 22, 2017

(54) GATEWAY RELOCATION CONTROL METHOD AND CONTROL DEVICE IN MOBILE COMMUNICATION SYSTEM

(75) Inventors: Jun Awano, Tokyo (JP); Toshiyuki Tamura, Tokyo (JP)

(73) Assignee: NEC Corporation, Tokyo (JP)

(*) Notice: Subject to any disclaimer, the term of this patent is extended or adjusted under 35 U.S.C. 154(b) by 593 days.

(21) Appl. No.: 13/993,670

(22) PCT Filed: Dec. 12, 2011

(86) PCT No.: PCT/JP2011/006911
§ 371 (c)(1),
(2), (4) Date: Oct. 3, 2013

(87) PCT Pub. No.: WO2012/081215
PCT Pub. Date: Jun. 21, 2012

(65) Prior Publication Data
US 2014/0036778 A1 Feb. 6, 2014

(30) Foreign Application Priority Data

Dec. 13, 2010 (JP) ................................ 2010-276699

(51) Int. Cl.
*H04W 16/18* (2009.01)
*H04W 36/00* (2009.01)
*H04W 36/12* (2009.01)

(52) U.S. Cl.
CPC ....... *H04W 16/18* (2013.01); *H04W 36/0083* (2013.01); *H04W 36/12* (2013.01)

(58) Field of Classification Search
CPC .. H04W 16/18; H04W 36/0083; H04W 36/12
See application file for complete search history.

(56) References Cited

U.S. PATENT DOCUMENTS 8,917,662 B2    12/2014   Kim et al.
2005/0221825 A1 10/2005   Osugi
(Continued)

FOREIGN PATENT DOCUMENTS

JP    2004-336424 A    11/2004
JP    2005-295189 A    10/2005
(Continued)

OTHER PUBLICATIONS

International Search Report (ISR) (PCT Form PCT/ISA/210) dated Jan. 17, 2012, in PCT/JP2011/006911, with English translation thereof.
(Continued)

*Primary Examiner* — Thai Nguyen
(74) *Attorney, Agent, or Firm* — McGinn IP Law Group, PLLC

(57) ABSTRACT

A control method and device, as well as a system, are provided that make it possible to perform relocation at an appropriate timing without impairing a user's sensory feeling about use of a service. A relocation control device 301 that controls relocation of a packet network gateway 100a which provides functionality as an anchor for ensuring mobility of a mobile terminal in a mobile communication system, includes a bearer information acquisition section 311 that, when an occasion for relocation arises, acquires information to obtain importance and a use state of a communication between a mobile terminal 50 and the packet network gateway 100a, and a relocation determination section 312 that determines whether or not to perform relocation, based on the importance and the use state of the communication.

23 Claims, 14 Drawing Sheets

(56) References Cited

U.S. PATENT DOCUMENTS

| | | | | |
|---|---|---|---|---|
| 2008/0076441 A1* | 3/2008 | Zhou | ................. | H04W 36/26 455/452.2 |
| 2011/0038318 A1 | 2/2011 | Parsons et al. | | |
| 2011/0171953 A1* | 7/2011 | Faccin | ................. | H04W 48/08 455/426.1 |
| 2012/0076121 A1* | 3/2012 | Choi | ................. | H04W 76/062 370/338 |
| 2012/0184294 A1* | 7/2012 | Stojanovski | ......... | H04W 48/17 455/456.1 |

FOREIGN PATENT DOCUMENTS

| | | |
|---|---|---|
| JP | 2009-004851 | 1/2009 |
| JP | 2010-124264 A | 6/2010 |
| KR | 10-2008-0090116 A | 10/2008 |
| KR | 10-2010-0120259 A | 11/2010 |
| WO | WO 2009/132435 A1 | 11/2009 |

OTHER PUBLICATIONS

3GPP TS 23. 401 V10.0.0, Jun. 2010, 3GPP TS23. 401 V10.0.0 "General Packet Radio Service (GPRS) enhancements for Evolved Universal Terrestrial Radio Access Network (E-UTRAN) access" Apr. 3, 2015 URL: http://www.quintillion.co.jp/3gpp/Specs/23401-a00.pdf.

Korean Office Action dated Dec. 19, 2014 with a partial English and Japanese translation.

Japanese Office Action dated Sep. 30, 2015 with a partial English translation.

* cited by examiner

FIG. 5

RECORD SECTION 213

COMMUNICATION STATE INFORMATION TABLE

| TERMINAL IDENTIFIER | BEARER IDENTIFIER | COMMUNICATION STATE INFORMATION |
|---|---|---|
| IMSI#1 | Bearer ID#1 | Conn_Info_Set {1, 1} |
| | Bearer ID#2 | Conn_Info_Set {1, 2} |
| IMSI#2 | Bearer ID#1 | Conn_Info_Set {2, 1} |
| .... | .... | .... |

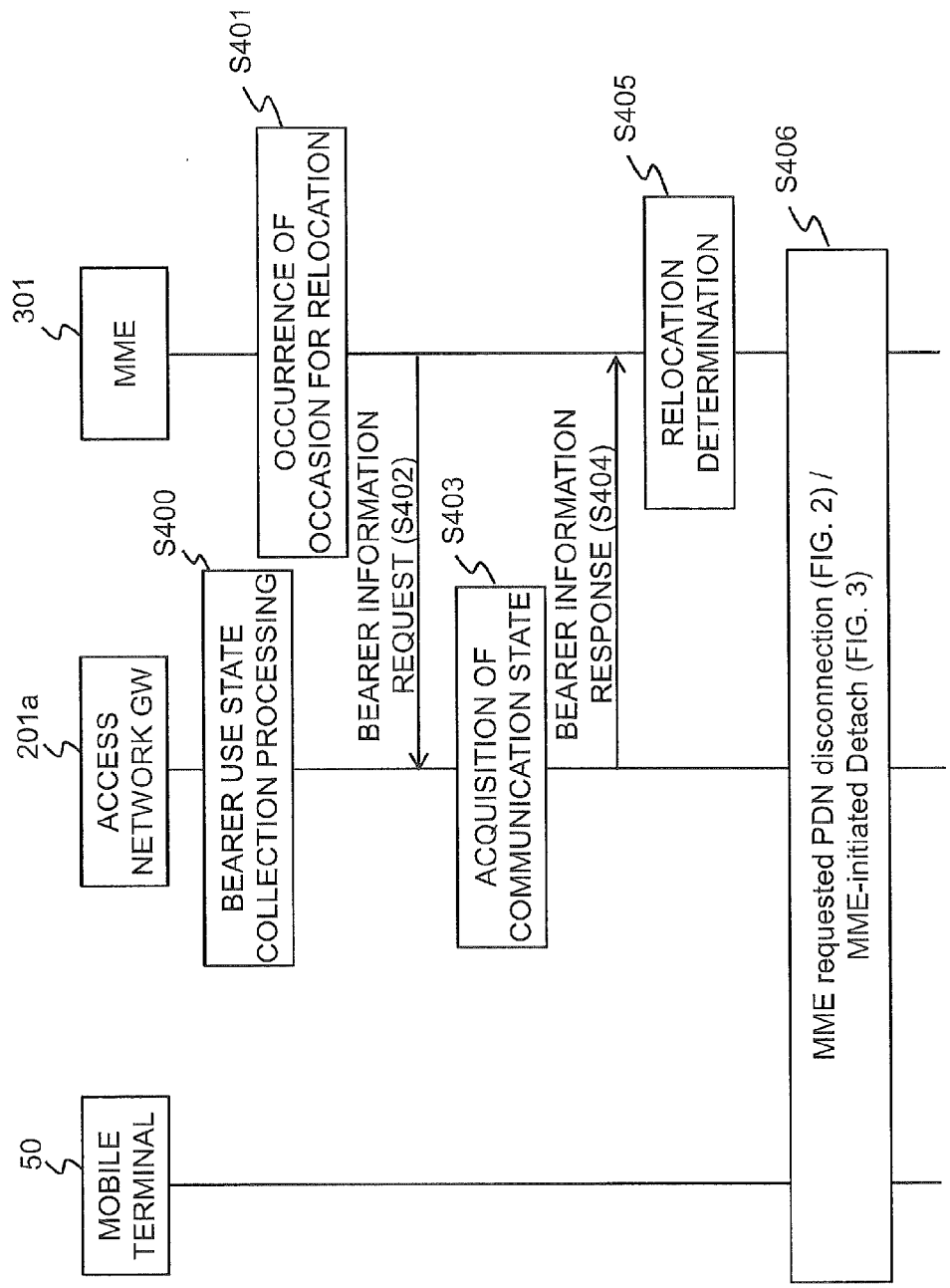

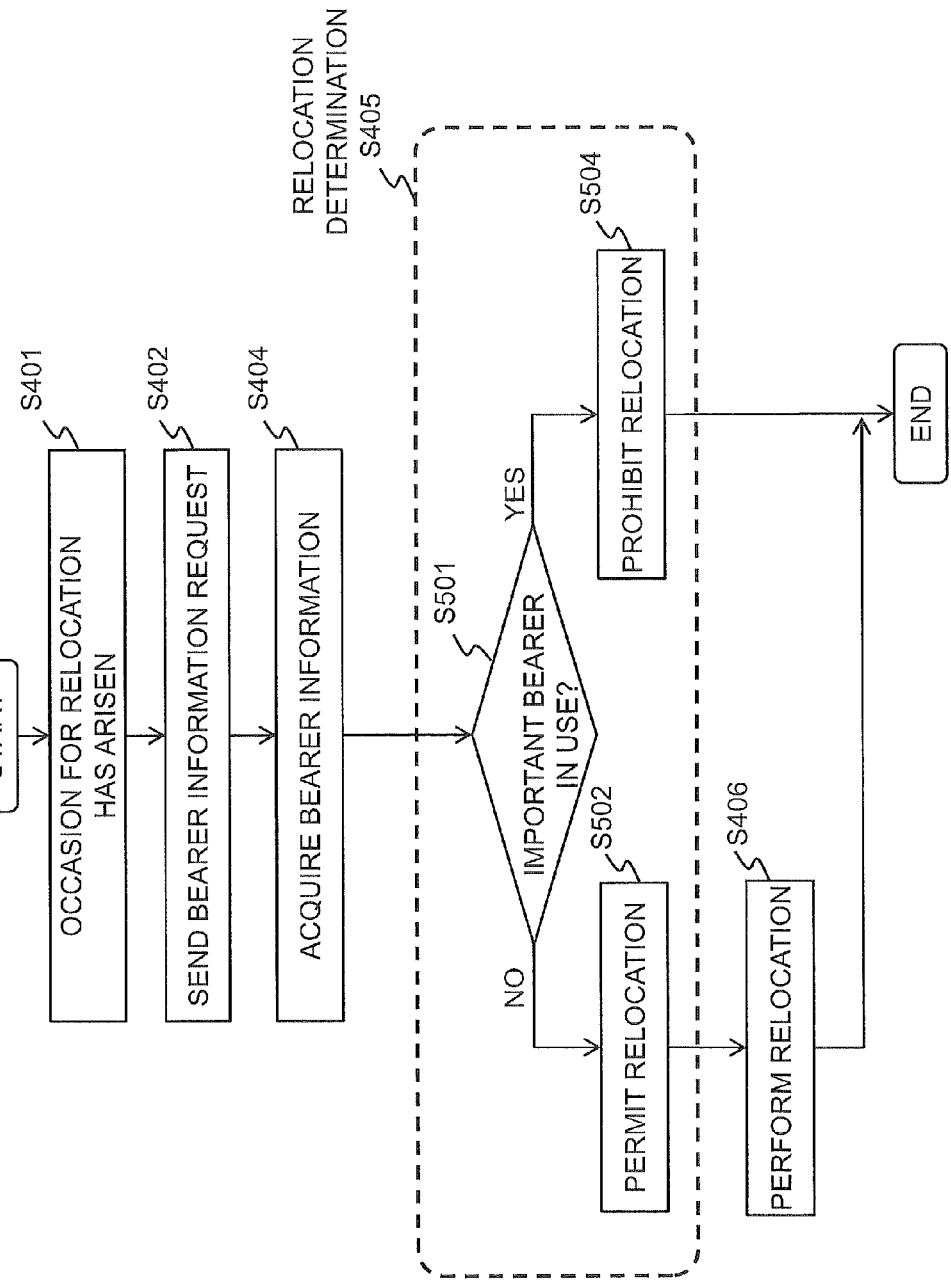

FIG. 8

STANDARDIZED QCI VALUES

| QCI | RESOURCE TYPE | PRIORITY | PACKET DELAY BUDGET | PACKET ERROR LOSS RATE | EXAMPLE SERVICES |
|---|---|---|---|---|---|
| 1 | GBR | 2 | 100 ms | $10^{-2}$ | CONVERSATIONAL VOICE |
| 2 | GBR | 4 | 150 ms | $10^{-3}$ | CONVERSATIONAL VIDEO (LIVE STREAMING) |
| 3 | GBR | 3 | 50 ms | $10^{-3}$ | REAL TIME GAMING |
| 4 | GBR | 5 | 300 ms | $10^{-6}$ | NON-CONVERSATIONAL VIDEO (BUFFERED STREAMING) |
| 5 | Non-GBR | 1 | 100 ms | $10^{-6}$ | IMS SIGNALING |
| 6 | Non-GBR | 6 | 300 ms | $10^{-6}$ | VIDEO (BUFFERED STREAMING) TCP-BASED (e.g., www, e-mail, chat, ftp, p2p file sharing, progressive video, etc.) |
| 7 | Non-GBR | 7 | 100 ms | $10^{-3}$ | VOICE, VIDEO (LIVE STREAMING) INTERACTIVE GAMING |
| 8 | Non-GBR | 8 | 300 ms | $10^{-6}$ | VIDEO (BUFFERED STREAMING) TCP-BASED (e.g., www, e-mail, chat, ftp, p2p file sharing, progressive video, etc.) |
| 9 | Non-GBR | 9 | | | |

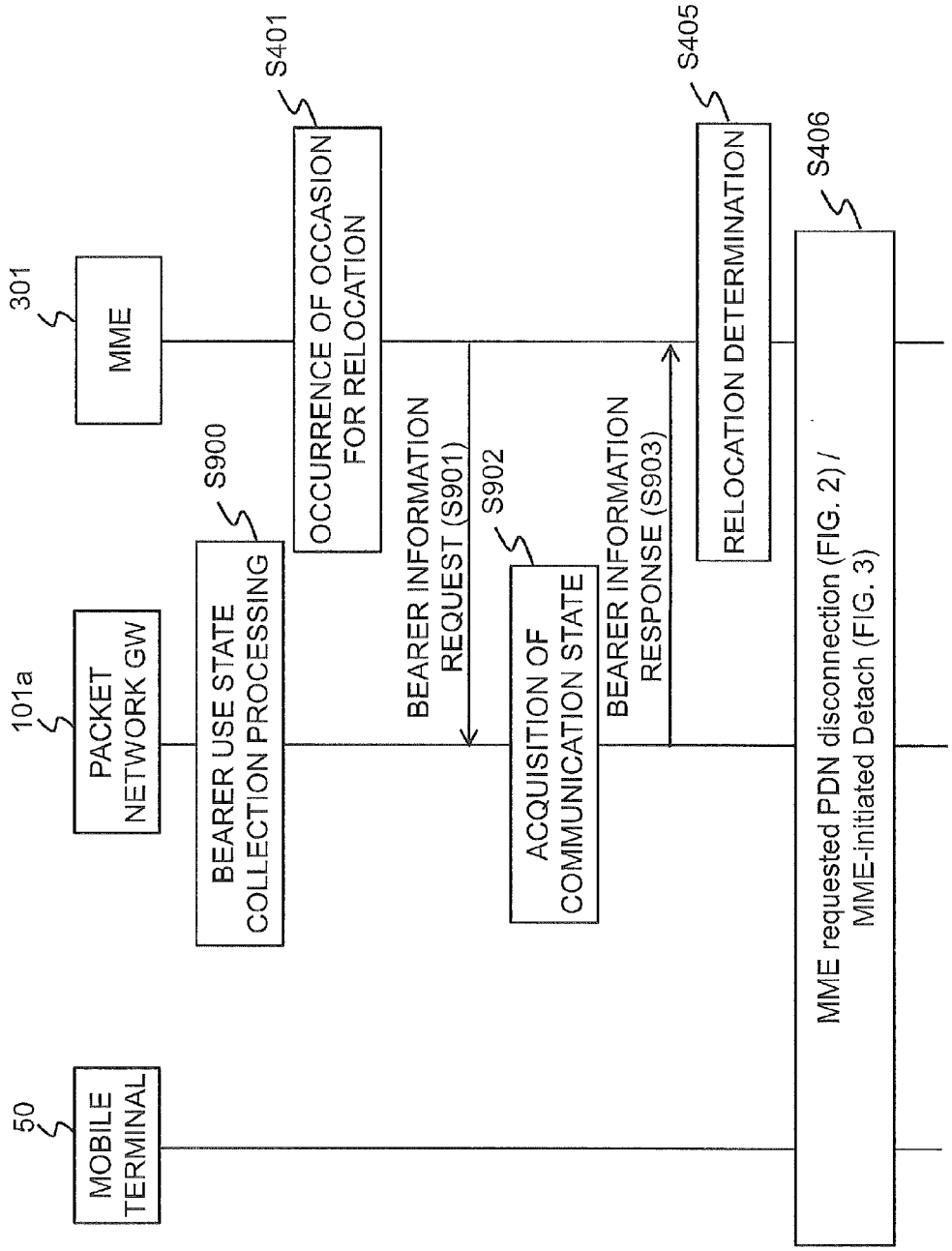

GATEWAY RELOCATION CONTROL METHOD AND CONTROL DEVICE IN MOBILE COMMUNICATION SYSTEM

TECHNICAL FIELD

The present invention relates to a mobile communication system and, more particularly, to a relocation control method and device for a gateway (hereinafter, abbreviated as GW) assigned as an anchor to a mobile terminal.

BACKGROUND ART

A. Mobile Communication System

First, referring to FIG. 1, a brief description will be given of a mobile communication system in 3GPP (3rd Generation Partnership Project). Note that nodes and functions that do not relate to the background art of the present invention will be omitted.

As shown in FIG. 1, the mobile communication system is comprised broadly of several networks including a core network 10, an access network 20, an external IP (Internet Protocol) network 30, and the Internet 40, and a mobile terminal 50 connected to the access network 20 in a mobile manner.

The mobile terminal 50 can use services provided from the external IP network 30 and the Internet 40, through the access network 20 and the core network 10. Here, although the external IP network 30 and the Internet 40 are identical in the point that they are both IP networks, they are distinguished from each other for the sake of convenience.

The core network 10 is a network managed by an operator that mainly provides mobile communication services and is assumed to be Evolved Packet Core (EPC) here. The core network 10 includes a packet network GW 100, an access network GW 200, a HSS (Home Subscriber Server) 400, a MME (Mobility Management Entity) 300, and a local GW 500.

Here, the packet GW network 100 corresponds to a packet data network gateway (PDN GW) or GGSN (Gateway GPRS (General Packet Radio Service) Support Node) in 3GPP. Moreover, the access network GW 200 corresponds to a serving gateway (S-GW) or SGSN (Serving GPRS Support Node).

The packet network GW 100 has a function as an anchor which transfers communication data addressed to the mobile terminal 50 to the mobile terminal 50 when the mobile terminal 50 has moved within the access network 20 where the same radio technology is applied, or has moved between the access networks 20 where different radio technologies are applied. Moreover, the packet network GW 100 has a role as a gateway to the external IP network 30.

The access network GW 200 has a role as a gateway which provides a function of connecting to the access network 20, and has a function of transferring user data transmitted from a radio base station 600, which is originated from the mobile terminal 50, to the packet network GW 100. The access network GW 200 has a function of, reversely, transferring user data transmitted from the packet network GW 100, which is addressed to the mobile terminal 50, to the radio base station 600. Moreover, the access network GW 200 also has a function as an anchor when the mobile terminal 50 has moved within a range the access network GW 200 covers in the access network 20.

The MME 300 has a function of setting and managing a data path in accordance with a policy of the network (i.e., a policy of the operator operating the network) and with a request from the mobile terminal 50. When the mobile terminal 50 has connected to the mobile communication system, the MME 300 downloads from the HSS 400 various setting information associated with a subscriber of this mobile terminal 50 and executes setting and management of a data path based on the information obtained here. Here, the data path is a logical data path set up between the packet network GW 100 and the mobile terminal 50 via the access network GW 200 and the radio base station 600, and user data for the mobile terminal 50 is transferred through this data path. This logical data path is called bearer and is assigned a bearer identifier that, with identification information on the mobile terminal, uniquely identifies the bearer. Moreover, a unit formed by collecting a plurality of bearers between the mobile terminal 50 of interest and the packet network GW 100 is called PDN connection. The MME 300 is a node that processes control signals, and one of the features of EPC is an architecture in which such control signal processing and user data processing are split. Such an architecture is called C (Control)-plane/U (User)-plane split.

The HSS 400 maintains subscriber information and has a function of performing processing for authenticating the mobile terminal 50 and, by request from the MME 300, transmitting to the MME 300 various setting information associated with the mobile terminal 50 as mentioned above.

The access network 20 is a network that accommodates mobile terminals based on a radio access technology such as LTE (Long Term Evolution), W-CDMA (Wideband Code Division Multiple Access), or WLAN (Wireless Local Area Network). The radio base station 600 is deployed in the access network 20, and the radio base station 600 connects to the mobile terminal 50 by using the radio access technology. The radio base station 600 corresponds to eNodeB, or a set of RNC (Radio Network Controller) and NodeB in 3GPP.

The external IP network 30 is an IP network connected to the core network 10 via the packet network GW 100, and various servers and the like placed in this network provide services to the mobile terminal 50. For example, in some cases, the external network 30 is a network managed by the same manager that manages the core network 10; in other cases, it is a network managed by a different fixed IPS (Internet Service Provider) or a network of an enterprise.

The mobile terminal 50 includes a radio interface and connects to the radio base station 600 by using a radio access technology. The mobile terminal 50, upon connecting to the radio base station 600, can access services provided in the external IP network 30 and the Internet 40 by using a user data transmission path (i.e., bearer) set up between the packet network GW 100 and the mobile terminal 50. The mobile terminal 50 corresponds to UE (User Equipment) in 3GPP.

Incidentally, to avoid complicating the drawing, FIG. 1 shows a single packet network GW 100, a signal access network GW 200, and a single radio base station 600. However, an actual topology is a tree topology in which a packet network GW 100 is at the top and a plurality of radio base stations 600 are at the lowest ends, that is, a packet network GW 100 accommodates a plurality of access network GWs 200, and each access network GW 200 further accommodates a plurality of radio base stations 600. With such a structure, it is possible to provide continual communication services even when the mobile terminal 50 moves between radio base stations.

B. Relocation

In recent years, there are increasing opportunities when moving images are viewed on mobile telephones. This trend is growing stronger due to the advent of smart phones typified by iPhone (registered trademark) and Android (registered trademark). Moreover, it is expected that traffic for view of moving images will experience explosive growth in future, due to higher-resolution terminals, enhanced processing performance, and LTE-based broader wireless bandwidth.

An existing mobile communication system is in a tree topology with an anchor, which is the packet network GW 100, placed at the top, as described earlier. Therefore, it is conceivable that traffic is concentrated on the packet network GW 100, which will be incapable of handling an explosive increase in traffic in future. Although it is possible to distribute the loads by increasing the number of packet network GWs 100, there is a problem that excessive costs incur. Moreover, the fact will not be changed that large amounts of network resources in the core network 10 are consumed.

To solve this problem, in 3GPP, a technique is proposed and approved in which specific traffic such as traffic of a moving image is bypassed to the external IP network 30 from a location as close as possible to the access network 20. This is the technique called SIPTO (Selected Internet Protocol Traffic Offload) (for example, see NPL 1, page 33, 4.3.15).

According to SIPTO, basically, a set of the packet network GW 100 and the access network GW 200 is placed close to the access network, and such a structure is almost similar to the above-described structure. However, an actual product is expected to be smaller in size and lower in performance and cost than the packet network GW100 and the access network GW 200. Moreover, such a packet network GW 100 and an access network GW 200 are expected to be co-located in a single box. In this case, it is conceivable that in some cases, the packet network GW and the access network GW are mounted on different respective blades, which are installed on a single chassis; in other cases, respective software of the packet network GW and the access network GW individually operates on the same blade. Further, in other conceivable cases, respective functions of the packet network GW and the access network GW are executed by using the same software in some cases. Various methods are conceivable for such a co-location method.

The local GW 500 in FIG. 1 is a node in which a packet network GW 100 and an access network GW 200 as described above are co-located. The local GW 500 is connected to an external IP network 30b through a function of the internal packet network GW, and also functions as an anchor when the mobile terminal 50 has moved. Moreover, similarly to the access network GW 200, the local GW 500 also has interfaces with the MME 300 and the radio base station 600. Note that a conceivable example of the external IP network 30b is a network of a fixed network carrier that provides IP connection services near the local GW 500.

Loads on the core network 10 can be reduced by placing the local GW 500 near the radio base station 600. However, when the mobile terminal 50 has moved greatly, there are some cases where there is another local GW 500 that is closer to a radio base station 600 to which the mobile terminal 50 has moved to. In this case, it is preferable to change (relocate) the local GW 500 for accommodating the mobile terminal 50 to a local GW 500 that is more suitable, i.e., closer geographically or network-topologically.

For this relocation processing, a "MME requested PDN disconnection" procedure (NPL 1, FIG. 5.10.3-1) shown in FIG. 2 or a "MME-initiated Detach" procedure (NPL 1, FIG. 5.3.8.3-1) shown in FIG. 3 is applied. Although details thereof are omitted, in the MME requested PDN disconnection procedure, a PDN connection serving as a user data transmission path set up between a packet network GW (PDN-GW) and a mobile terminal (UE) is disconnected, and in the MME-initiated Detach procedure, a mobile terminal is once disconnected from a network. Then, in any of the procedures, a signal containing information for requesting re-connection is transmitted to the mobile terminal 50.

Specifically, in the MME requested PDN disconnection procedure shown in FIG. 2, information for requesting to reconfigure a PDN connection is contained in Step 7 (Deactivate Bearer Request). In the MME-initiated Detach procedure shown in FIG. 3, information for requesting re-connection is contained in Step 1(Detach Request). As a result, the mobile terminal 50 performs processing for re-connecting to a new PDN-GW and, upon this re-connection, is newly assigned a PDN-GW that is closer to it. Since the local GW 500 is a node in which a PDN-GW and a S-GW are co-located as described above, relocation can be achieved through similar processing. Hereinafter, unless otherwise noted, packet network GW (P-GW) relocation will also include local GW relocation.

As described above, relocation of the packet network GW 100 in SIPTO is performed through the procedure shown in FIG. 2 or 3 by the MME 300, with a policy of the network taken into consideration.

Regarding processing for access network GW relocation, PTL 1 discloses a method for determining relocation execution timing. For an access network GW disclosed in PTL 1, relocation following a change in communication path at the time of handover is performed if the total data throughput per unit time of a relocation-target access network GW is smaller than a predetermined value. That is, relocation is performed when loads on a relocation target is small, whereby the rate of success is increased.

CITATION LIST

Patent Literature

[PTL 1]
Japanese Patent Application Unexamined Publication No. 2010-124264

Non Patent Literature

[NPL 1]
3GPP TS23.401 V10.0.0 "General Packet Radio Service (GPRS) enhancements for Evolved Universal Terrestrial Radio Access Network (E-UTRAN) access"
[NPL 2]
3GPP TS23.203 V9.1.0 "Policy and charging control architecture"

SUMMARY OF INVENTION

Technical Problem

When packet network GW relocation is performed through a procedure as described above, a PDN connection set up between the mobile terminal 50 and the original packet network GW 100 is deleted in any of the MME requested PDN disconnection procedure shown in FIG. 2 and the MME-initiated Detach procedure shown in FIG. 3. Accordingly, if the mobile terminal 50 has been performing communication, this communication is disconnected, in which case, particularly in a case of important communication such as a voice call, a service interruption will greatly degrade a user's sensory feeling about the call. As described above, when a mobile entity itself or a user riding in/on a moving object moves while keeping communication, or has moved from an area provided with no local GW to an area provided with a local GW, or the like, the necessity arises to perform relocation of the P-GW or local GW that functions as an anchor, to avoid a redundant path. However, in the relocation procedures adopted by 3GPP, communication continuity is not ensured.

The MME 300, which is a node to process C-Plane, is not located on a path (U-Plane) over which user data is transferred, and has no way of knowing communication states, such as what kinks of user data and how much user data are flowing. Therefore, the MME 300 cannot perform relocation with actual communication states such as a case of performing an important communication taken into consideration.

Moreover, the method disclosed in PTL 1 is to determine whether or not to perform relocation depending on the loaded state of a relocation-target GW, and does not teach a relocation control method in which consideration is given to the importance of a communication for which paths are changed. That is, regardless of whether or not a communication is important, only the loaded state of a relocation-target GW is used as a criterion for determining to perform relocation, and therefore, a service interruption during an important communication such as a voice call cannot be avoided.

Accordingly, an object of the present invention is to provide a control method and device, as well as a system, that make it possible to perform relocation at an appropriate timing, without impairing a user's sensory feeling about use of a service.

Solution to Problem

A relocation control device according to the present invention is a relocation control device for controlling relocation of a packet network gateway that provides functionality as an anchor for ensuring mobility of a mobile terminal in a mobile communication system, characterized by comprising: information acquisition means for, when an occasion for relocation arises, acquiring communication state information to obtain importance and a use state of a communication between the mobile terminal and the packet network gateway; and relocation determination means for determining whether or not to perform the relocation, based on the importance and the use state of the communication.

A relocation control method according to the present invention is a method for controlling relocation of a packet network gateway that provides functionality as an anchor for ensuring mobility of a mobile terminal in a mobile communication system, characterized in that a mobility management node in the mobile communication system, when an occasion for relocation arises, determines whether or not to perform the relocation, based on importance and a use state of a communication between the mobile terminal and the packet network gateway.

Advantageous Effects of Invention

According to the present invention, it is possible to perform relocation at an appropriate timing, without impairing a user's sensory feeling about use of a service.

BRIEF DESCRIPTION OF DRAWINGS

FIG. 5 is a diagram schematically showing an example of a communication state information table.

FIG. 6 is a sequence diagram showing a relocation control method according to the first exemplary embodiment.

FIG. 7 is a flowchart showing the relocation control method at a MME according to the first exemplary embodiment.

FIG. 8 is a diagram schematically showing an example of importance reference data used in the relocation control method according to the first exemplary embodiment.

FIG. 14 is a sequence diagram showing a relocation control method according to the fourth exemplary embodiment.

DESCRIPTION OF EMBODIMENTS

As will be described in detail below, a relocation control device according to each exemplary embodiment of the present invention is disposed at a mobility management node that processes control signals of a mobile communication system and, here, is installed in a MME (mobility management device) of a mobile communication system in EPS (Evolved Packet System) standardized by 3GPP. An entire structure of the mobile communication system is basically the same as that shown in FIG. 1. Hereinafter, a radio base station, an access network GW, and a packet network GW on a communication path before relocation will be represented by adding a suffix "a" to each of their reference signs, and those on a communication path after relocation will be represented by adding a suffix "b" to each of their reference signs.

1. First Exemplary Embodiment
1.1) System Structure

Figure 1:
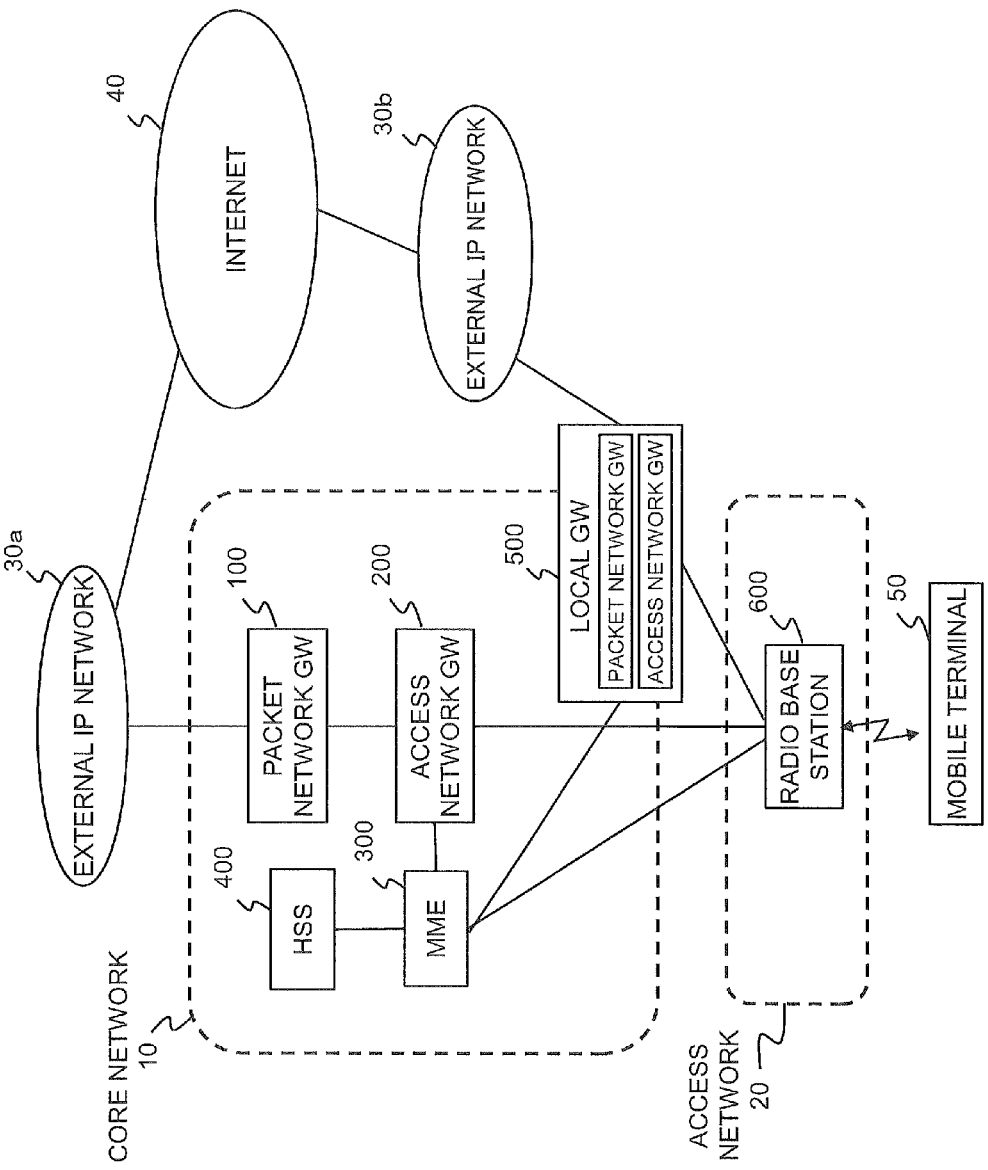
FIG. 1 is a system structure diagram showing a structure of an existing mobile communication system.
Figure 4:
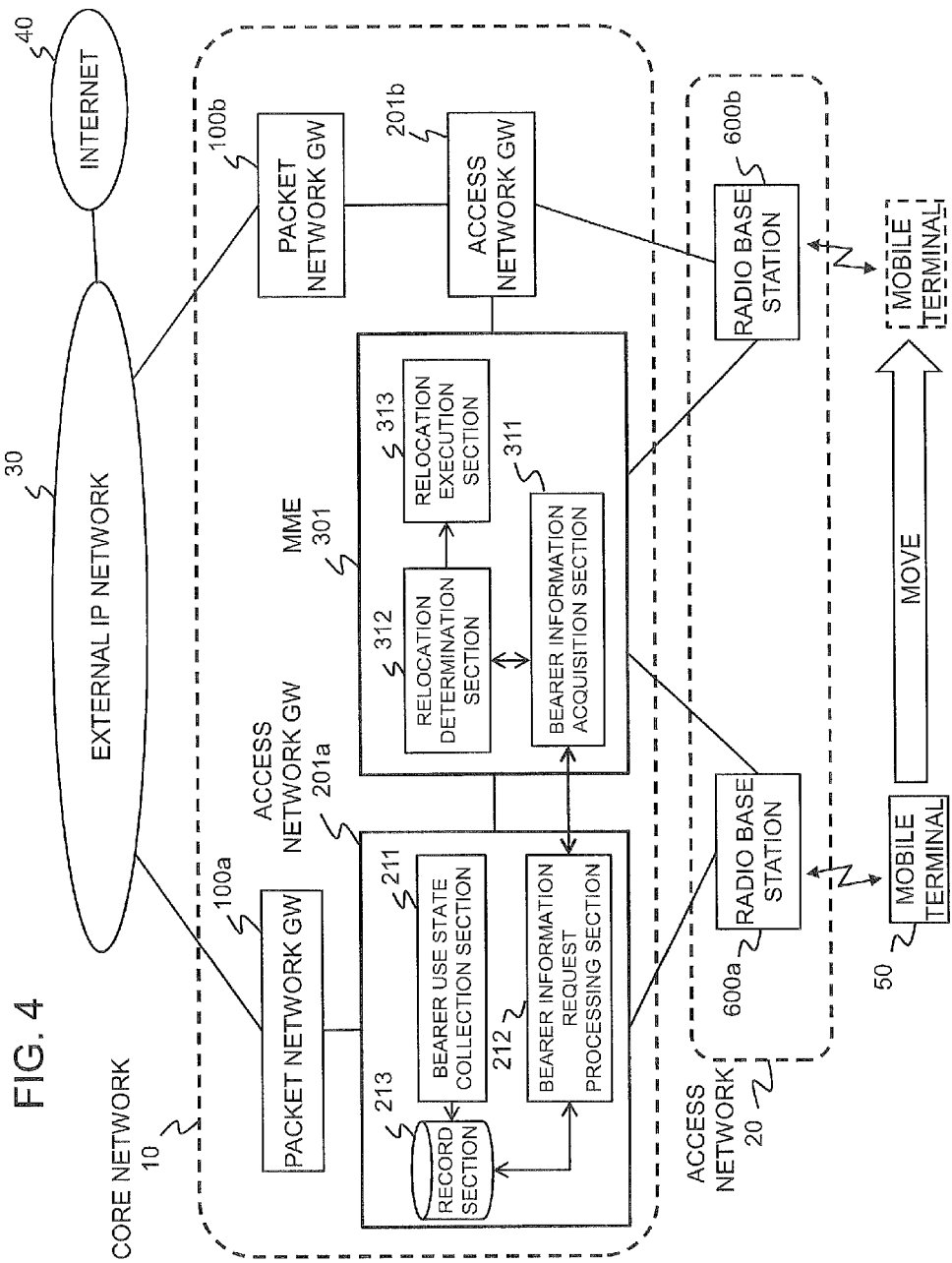
FIG. 4 is a schematic diagram of a mobile communication system in which a relocation control device according to a first exemplary embodiment of the present invention is installed.

As shown in FIG. 4, a mobile communication system to which the present invention is applied includes a core network 10, an access network 20, an external IP (Internet Protocol) network 30, the Internet 40, and a mobile terminal 50 that can move and connects to the access network 20, as described already in FIG. 1. Note that the mobile communication system may also include a local GW described in FIG. 1.

It is assumed that the mobile terminal 50 is currently connecting to a radio base station 600a, that a path (bearer) for user data transmission is set up between the mobile terminal 50 and a packet network GW 100a via an access network GW 201a, and that the mobile terminal 50 uses services provided by the external IP network 30 and the Internet 40 through this data path. The access network GW 201a monitors the use state of this bearer and, in response to a request, sends monitor information to a MME 301a, which will be described later.

When this mobile terminal 50 has moved and so has connected to another radio base station 600b, the MME 301 determines whether or not to perform processing for relocation to a packet network GW 100b, based on the monitored use state of the bearer, which will be described later. When relocation processing is not performed, a path (bearer) for user data transmission is set up between the mobile terminal 50 and the packet network GW 100a via the access network GW 201a and the radio base station 600b. On the other hand, if relocation processing is performed, a path (bearer) for user data transmission is set up between the mobile terminal 50 and the packet network GW 100b via the radio base station 600b and an access network GW 201b. Through the data path thus set up, the mobile terminal 50 can use again the services provided by the external IP network 30 and the Internet 40. Note that communication that has been started before relocation of the packet network GW 100a cannot be continually used, as shown in the conventional examples.

1.2) Collection of Bearer Information

The access network GW (201a, 201b) in the present exemplary embodiment has functions including a bearer use state collection section 211, a bearer information request processing section 212, and a record section 213, in addition to the functionality of an ordinary access network GW.

The bearer use state collection section 211 collects packet information about user data passing through each bearer belonging to a PDN connection of the mobile terminal 50 and generates at least one piece of the following information.

Latest time of detection of a packet transmitted/received
The numbers of packet transmissions and receptions per unit time (e.g., one second)
The packet transmission bit rate and reception bit rate per unit time (e.g., one second)
Presence/absence of a TCP session Hereinafter, these pieces of information will be collectively called "communication state information." Note that communication state information may include other things than the above-mentioned ones. For example, usableness/unusableness is determined based on the above-mentioned information, and a result of this determination may be used as communication state information. Moreover, communication state information may be generated in smaller granularity than the bearer unit. For example, communication state information may be generated in units of specific applications or specific addresses, by using information on an IP packet flowing along a bearer, such as its address or port number.

The bearer use state collection section 211 further periodically, or at a timing of detecting a packet, records the collected communication state information in the record section 213 in, for example, a table format, associating it with a terminal identifier of the mobile terminal 50 (a user identifier may also be used, and the expression of the terminal identifier also includes it here) and with a bearer identifier.

The bearer information request processing section 212 has a search function of, upon receiving a bearer information request signal from the MME 301, searching a table of the communication state information recorded in the record section 213 by using a terminal identifier and a bearer identifier contained in the signal as keys, and acquiring corresponding communication state information, and a respond function of storing the acquired communication state information in a bearer information response signal and sending it back to the MME 301.

As shown in FIG. 5, the communication state information is recorded in the record section 213 in a table format for example. Here, for the identifier of the mobile terminal 50, for example, IMSI (International Mobile Subscriber Identity), ME Identity, or MSISDN (Mobile Subscriber ISDN Number) can be used. Note that an identifier other than these can also be used if the access network GW 201a maintains other information that can identify the mobile terminal 50. For the bearer identifier, EPS Bearer ID can be used. Use of the EPS Bearer ID together with the terminal identifier can uniquely identify a bearer. However, other identification information such as TEID (Tunnel Endpoint Identifier) may be used as long as a specific bearer of a specific mobile terminal can be uniquely identified. Moreover, when the communication state information is collected in smaller granularity as described above, information for identifying communication state information in such granularity is used.

The communication state information table stored in the record section 213 is updated by the bearer use state collection section 211 and is read out by the bearer information request processing section 212. In FIG. 5, IMSI#n is the identifier of a mobile terminal n. BearerID#m is the identifier of a specific bearer m of the mobile terminal identified by the terminal identifier IMSI#n. Conn_Infor_Sec [n, m] represents communication state information about the bearer uniquely identified by the mobile terminal identifier and the bearer identifier. This communication state information is recorded as an information set showing a single or a plurality of communication states.

Note that although the bearer use state collection section 211 and the bearer information request processing section 212 can be implemented by using hardware, their equivalent functions can also be implemented by executing programs stored in a memory (not shown) on a program-controlled processor such as CPU (Central Processing Unit).

1.3) MME

The MME 301 according to the present exemplary embodiment has functions including a bearer information acquisition section 311, a relocation determination section 312, and a relocation execution section 313, in addition to control functionality that an existing MME has, as shown in FIG. 4.

When the mobile terminal 50 has moved with the result that the packet network GW 100b is detected that is more suitable than the packet network GW 100a then serving as an anchor, then the bearer information acquisition section 311 inquires of the access network GW 201a locating on the path of a PDN connection established by this mobile terminal 50, about the actual use state of each bearer belonging to the PDN connection. Specifically, the bearer information acquisition section 311 sends the access network GW 201a a bearer information request signal containing information on the terminal identifier and the identifier of each bearer belonging to this PDN connection, and receives a bearer information response signal as a response to it, thereby acquiring communication state information. In case where the mobile terminal 50 has established a PDN connection with the local GW 500, the bearer information request here is sent to the local GW 500 (strictly speaking, to an access network GW function in the local GW 500).

Note that for a function of detecting the more suitable packet network GW 100*b* (including the case of the local GW 500), an existing one is sufficient, and it is not particularly limited in the present exemplary embodiment. Although details are omitted, it is sufficient to maintain, in the communication system, information that can locate the mobile terminal 50 (for example, an identifier of a radio base station or an identifier of a group of radio base stations) and an identifier (IP address or the like) of the packet network GW 100*b* (or the local GW 500) that is in its vicinity geographically or network-topologically. Moreover, detection is triggered when the MME 301 has received TAU (Tracking Area Update), which is a signal for the mobile terminal 50 to notify its own location information, but may also be triggered by other incidents.

In the bearer information request signal, stored are the identifier of the mobile terminal 50 and the bearer identifiers that are targets for which communication state information is to be acquired. The bearer identifier of a bearer established by the mobile terminal 50 is set by the MME 301 when the mobile terminal 50 is processed as described in FIG. 1. In case where the communication state information is collected in smaller granularity than the bearer unit, information that can identify the granularity may be further stored. Moreover, in case where the communication state information is acquired about all bearers with respect to the mobile terminal 50, it is also possible to store the identifier of the mobile terminal 50 only.

The relocation determination section 312, by using the communication state information on each bearer of the mobile terminal 50 acquired by the bearer information acquisition section 311, determines whether or not an important communication is actually being used, and determines whether or not to perform relocation of the packet network GW 100*a* serving as an anchor for the mobile terminal 50. Here, an important communication is a communication for which a service interruption should preferably be avoided, such as, for example, voice conversation or live streaming. When it is determined to perform relocation, relocation is performed through the already-described procedure as shown in FIG. 2 or 3.

Incidentally, the MME has a clue to the importance (QCI) of each bearer but does not know about whether or not the bearer is actually being used. Therefore, the MME acquires from the access network GW the communication state information as a clue to whether or not the bearer is actually being used. However, since communications passing the same bearer (i.e., having the same QCI) may have different levels of importance, it is also possible to identify an important communication by using the communication state information. For example, it is thought that the QCI of a bearer for the Internet is set to a lower level (best effort), but traffics for the Internet include a voice service for which a service interruption should preferably be avoided such as Skype (registered trademark) and also include a communication for which communication continuity (continuity of TCP session) is not important such as a mere WEB access.

Figure 2:
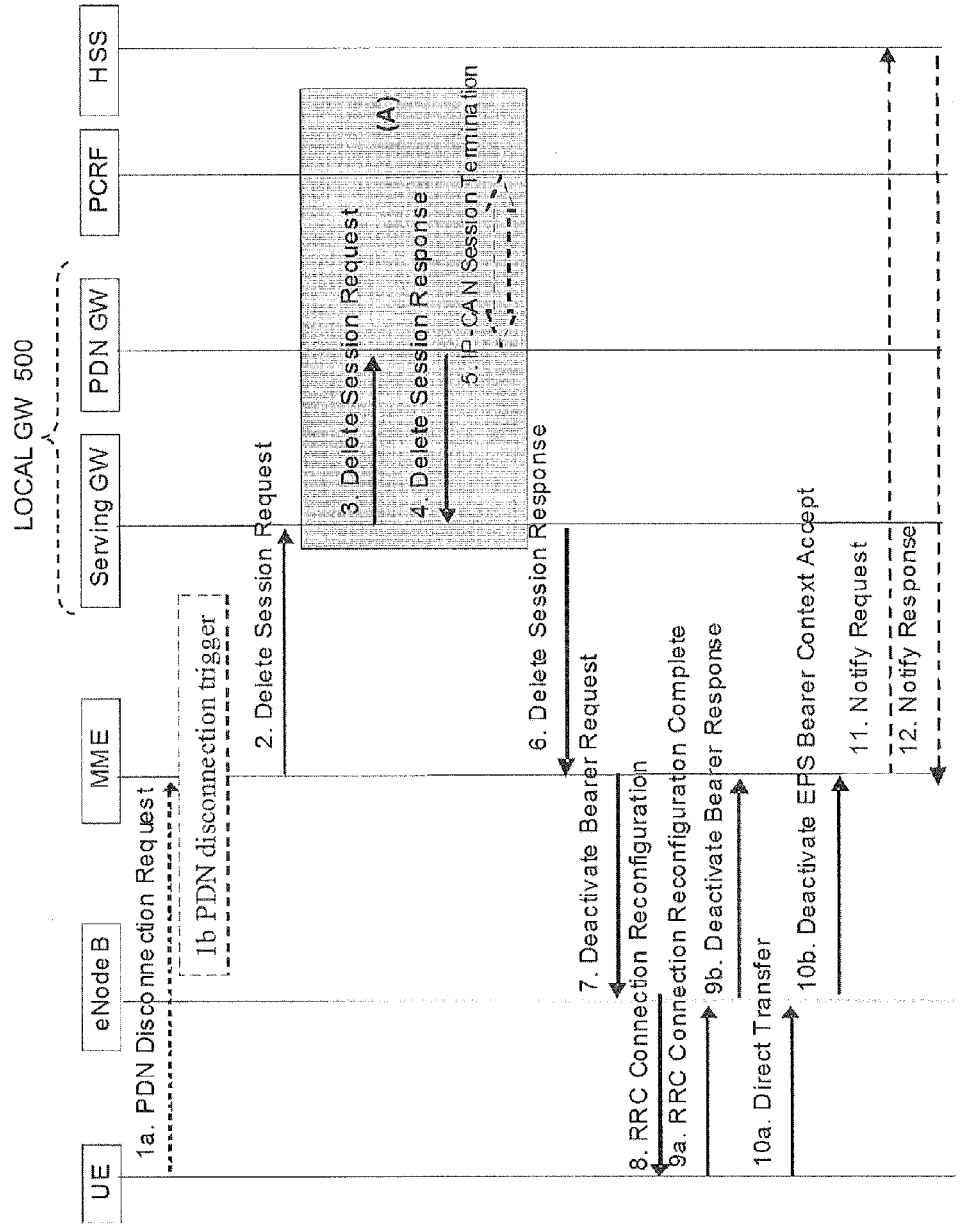
FIG. 2 is a sequence diagram showing a MME requested PDN disconnection procedure.
Figure 3:
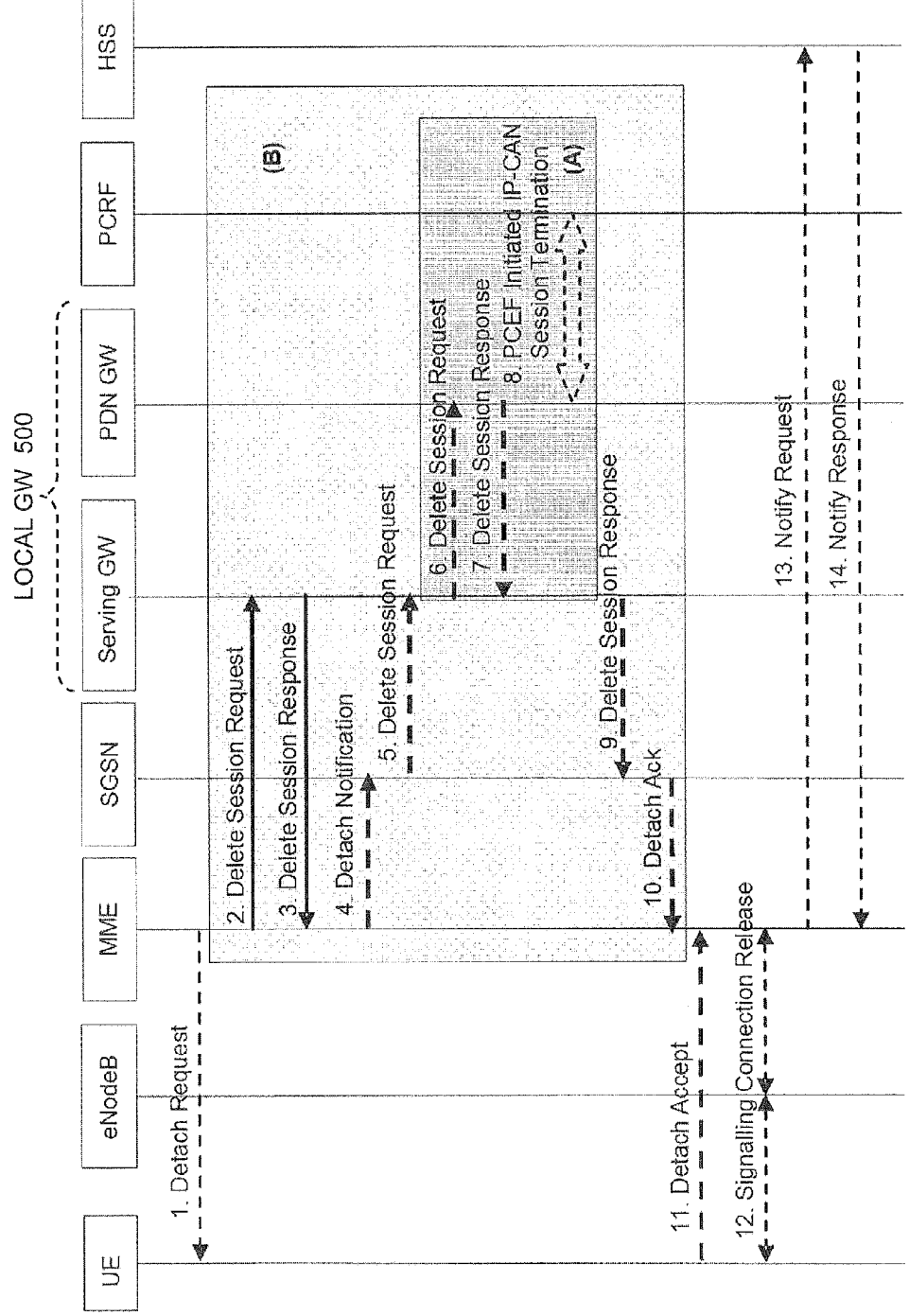
FIG. 3 is a sequence diagram showing a MME-initiated Detach procedure.

The relocation execution section 313 executes relocation through the MME requested PDN disconnection procedure shown in FIG. 2 or the MME-initiated Detach procedure shown in FIG. 3. This function is almost similar to that of the existing MME 300. However, information (e.g., "Relocation") for notifying an intention of relocation is set in the "Deactivation Bearer Request" at Step 7 in case of the MME requested PDN disconnection procedure shown in FIG. 2, or in the "Detach Request" at Step 1 in case of the MME-initiated Detach procedure shown in FIG. 3. As described already, the procedure shown in FIG. 2 is processing in which a PDN connection of a mobile terminal is once terminated and, when a PDN connection is established again, a more suitable packet network GW 100 is assigned. The procedure shown in FIG. 3 is processing in which when reconnecting a mobile terminal after once disconnecting it, a more suitable packet network GW 100 is assigned. That is, in any case, a bearer, which is a logical data path, is lost once. Even in such a case, if a notification of a temporary bearer loss intended for relocation can be made to the mobile terminal 50, it is possible to hide a service interruption to a user at an application level operating in the mobile terminal 50.

Note that although the bearer information acquisition section 311, the relocation determination section 312, and the relocation execution section 313 can be implemented by using hardware, their equivalent functions can also be implemented by executing programs stored in a memory (not shown) on a program-controlled processor such as CPU (Central Processing Unit).

1.4) Relocation Control

Relocation control operation according to the present exemplary embodiment will be described in detail with reference to FIGS. 6 to 8.

Referring to FIG. 6, the bearer use state collection section 211 of the access network GW 201*a* periodically, or at a timing of detecting a packet, records communication state information in the record section 213, associating it with the terminal identifier of the mobile terminal 50 and a bearer identifier (Step S400).

When the packet network GW 100*b* that is more suitable to the mobile terminal 50 is detected on the occasion of TAU reception or the like caused by a movement of the mobile terminal 50 or the like, the MME 301 starts a process for determining whether or not to perform packet network GW relocation (Step S401).

First, the bearer information acquisition section 311 sends a bearer information request to the access network GW 201*a* (Step S402). In the bearer information request, stored are the identifier of the mobile terminal 50 and the identifier(s) of one or a plurality of bearers established between the mobile terminal 50 and the packet network GW 100*a*. However, as described above, only the identifier of the mobile terminal 50 may be stored, or other information may also be stored to identify communication state information in smaller granularity. Having sent the bearer information request, the bearer information acquisition section 311 waits for a response from the access network GW 201*a*.

The bearer information request processing section 212 of the access network GW 201*a*, upon receiving the bearer information request, searches the communication state information table recorded in the record section 213 by using the terminal identifier and the bearer identifiers stored in the bearer information request, and acquires corresponding communication state information (Step S403). Upon acquiring the communication state information on each bearer established by the mobile terminal 50, the bearer information request processing section 212 stores the communication state information in a bearer information response and sends it back to the MME 301 as a response to the bearer information request (Step 404).

Upon receiving the bearer information response, the bearer information acquisition section 311 of the MME 301 outputs the communication state information on each bearer established by the mobile terminal 50 to the relocation determination section 312, and the relocation determination section 312 determines whether or not to perform relocation (Step 405). In case where packet network GW relocation is performed, the relocation execution section 313 performs relocation from the packet network GW 100*a* to the packet network GW 100*b* through the MME requested PDN disconnection procedure shown in FIG. 2 or the MME-initiated Detach procedure shown in FIG. 3 (Step 406). In this event, as described above, if a notification of a temporary bearer loss intended for relocation can be made to the mobile terminal 50, it is possible to hide a service interruption to a user at an application level operating in the mobile terminal 50.

Next, the determination processing by the relocation determination section 312 of the MME 301 will be described in more detail with reference to FIGS. 7 and 8. Note that Steps S401, S402, and S404 to S406 in FIG. 7 and those in FIG. 6 are the same steps and therefore denoted by the same reference signs.

In the relocation determination step S405, the relocation determination section 312, from the communication state information received from the bearer information acquisition section 311, collects information based on which the importance of bearers and the use states thereof can be estimated, and based on this information, determines whether or not an important bearer is being used (Step S501). If no important bearer is being used (Step S501: NO), relocation is permitted (Step S502), and relocation as described above is performed (Step S406). When an important bearer is being used (Step S501: YES), relocation is prohibited (Step S504).

For information indicating the importance of a bearer, a communication quality profile, for example, QCI (Quality of Service Class Identifier) defined by 3GPP can be used. QCI is an identifier indicating communication quality required of a communication along a bearer and is maintained by the MME 301 (for details about QCI, see NPL 2, page 30, Table 6.1.7).

As shown in FIG. 8, in case of using QCI to determine the importance of a bearer, as to QCI=1 to 4, a bearer can be thought to be important because it has GBR, that is, it is a communication with a guaranteed bandwidth. Moreover, as to QCI=5 and 7, it is reasonable to regard a bearer as a communication for which a service interruption should be avoided because IMS signaling, live streaming, and interactive gaming are shown as application examples. Therefore, if QCI=1 to 5 and 7, a bearer can be determined to be important.

In addition, in determination of the importance of a bearer, it is also possible to use other information such as GBR (Guaranteed Bit Rate), and it is also possible to combine such information. For example, in FIG. 8, if a resource type is GRB, a bearer is determined to be important. Since this is equivalent to QCI=1 to 4, a threshold value of QCI is set to 4, whereby it is also possible to determine a bearer to be important when QCI is not larger than 4. Further, the importance may also be estimated from an IP address, a TCP or UDP port number, or the like contained in the communication state information. In this case, the communication state information is used not only for determination of an actual communication state but also for determination of importance itself.

1.5) Effects

As described above, according to the first exemplary embodiment of the present invention, communication use states with respect to the mobile terminal 50 are collected by the access network GW 201*a* that is the source of relocation, and before relocation is started, the MME 301 determines whether or not to perform relocation, based on the importance of a bearer of interest. Thereby, it is possible to avoid a service interruption during an important communication such as voice conversation or live streaming, and it is possible to suppress degradation of a user's sensory feeling about reception of a service.

Moreover, since it is possible to consider the importance of a communication that a mobile terminal is performing when determining whether or not to perform relocation processing, it is possible to perform relocation at an appropriate timing, such as, for example, to perform relocation only when a best-effort communication is being performed.

2. Second Exemplary Embodiment 2.1) System Structure

A second exemplary embodiment of the present invention is different from the above-described first exemplary embodiment in that a MME acquires the use state of a bearer not from an access network GW but from a radio base station.

Figure 9:
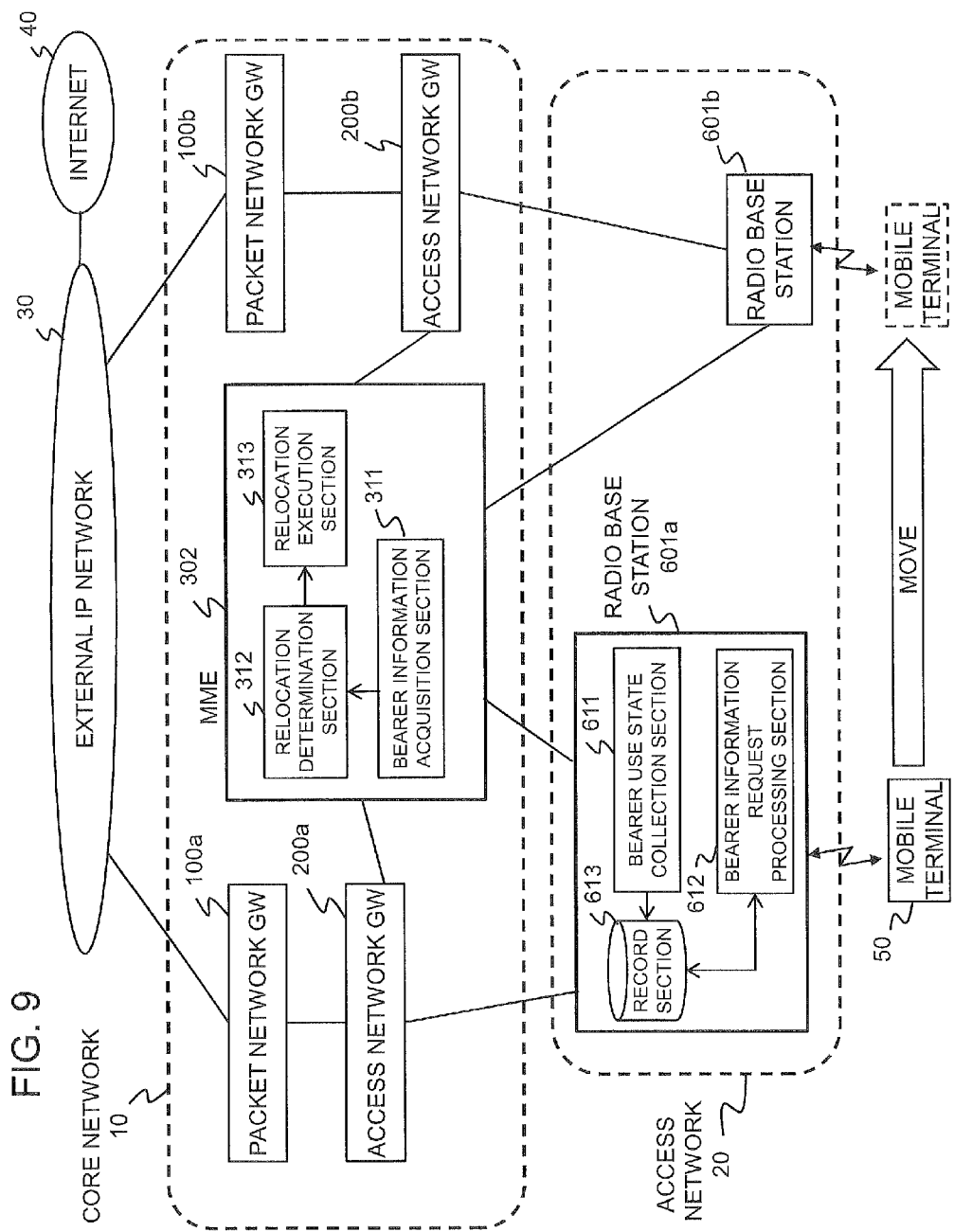
FIG. 9 is a schematic diagram of a mobile communication system in which a relocation control device according to a second exemplary embodiment of the present invention is installed.

Referring to FIG. 9, a radio base station (601*a*, 601*b*) is configured by including a bearer use state collection section 611, a bearer information request processing section 612, and a record section 613, in addition to functionality an ordinary radio base station has. Since the bearer use state collection section 611, the bearer information request processing section 612, and the record section 613 correspond to the bearer use state collection section 211, the bearer information request processing section 212, and the record section 213 in FIG. 4, respectively, and have similar functions thereto, a detailed description thereof will be omitted.

A MME 302 has functions including a bearer information acquisition section 311, a relocation determination section 312, and a relocation execution section 313, in addition to control functionality an existing MME has. Since these functions are similar to those of the MME 301 shown in FIG. 4 except that target nodes are different that a bearer information request signal is sent to and a bearer information response signal is received from, they are denoted by the same reference signs and a description thereof will be omitted.

2.2) Relocation Control

The MME 302 in the present exemplary embodiment is different from the MME 301 in the first exemplary embodiment in that a target node that a bearer information request signal is sent to and a bearer information response signal is received from is not an access network GW but the radio base station 601*a*.

Figure 10:
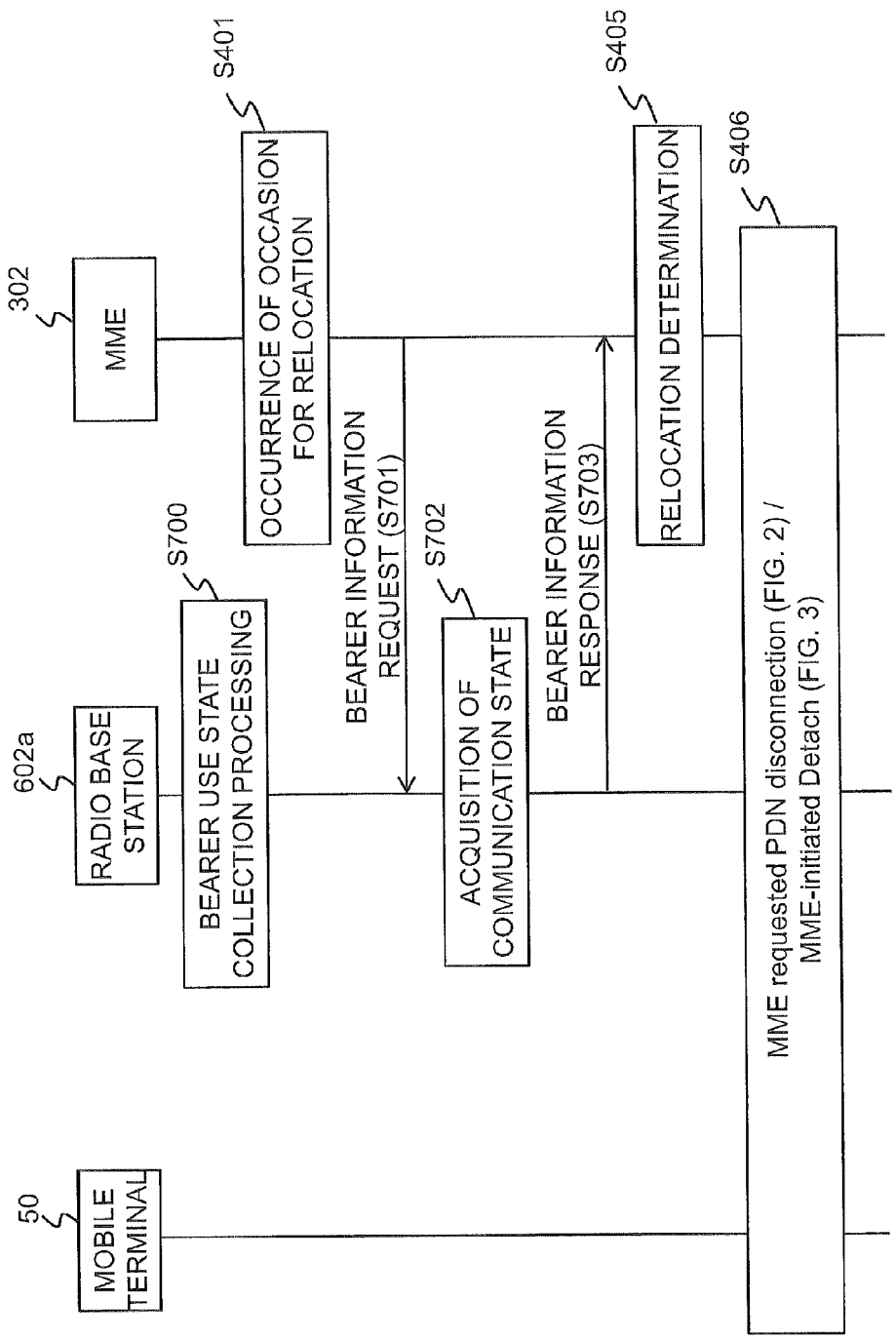
FIG. 10 is a sequence diagram showing a relocation control method according to the second exemplary embodiment.

Referring to FIG. 10, the bearer use state collection section 611 of the radio base station 601*a* periodically, or at a timing of detecting a packet, records communication state information in the record section 613, associating it with a terminal identifier of a mobile terminal 50 and a bearer identifier (Step S700).

When a packet network GW 100*b* that is more suitable to the mobile terminal 50 is detected on the occasion of TAU reception or the like caused by a movement of the mobile terminal 50 or the like, the MME 302 starts a process for determining whether or not to perform packet network GW relocation (Step S401).

First, the bearer information acquisition section 311 sends a bearer information request to the radio base station 601a (Step S701). In the bearer information request, stored are the identifier of the mobile terminal 50 and the identifier(s) of one or a plurality of bearers established between the mobile terminal 50 and a packet network GW 100a. However, as described earlier, only the identifier of the mobile terminal 50 may be stored, or other information may also be stored to identify communication state information in smaller granularity. Having sent the bearer information request, the bearer information acquisition section 311 waits for a response from the radio base station 601a.

The bearer information request processing section 612 of the radio base station 601a, upon receiving the bearer information request, searches the communication state information table recorded in the record section 613 by using the terminal identifier and the bearer identifiers stored in the bearer information request, and acquires corresponding communication state information (Step S702). Upon acquiring the communication state information on each bearer established by the mobile terminal 50, the bearer information request processing section 612 stores the communication state information in a bearer information response and sends it back to the MME 302 as a response to the bearer information request (Step 703).

Upon receiving the bearer information response, the bearer information acquisition section 311 of the MME 302 outputs the communication state information on each bearer established by the mobile terminal 50 to the relocation determination section 312, and the relocation determination section 312 determines whether or not to perform relocation (Step 405). In case where packet network GW relocation is performed, the relocation execution section 313 performs relocation from the packet network GW 100a to the packet network GW 100b through the MME requested PDN disconnection procedure shown in FIG. 2 or the MME-initiated Detach procedure shown in FIG. 3 (Step 406). In this event, as described above, if a notification of a temporary bearer loss intended for relocation can be made to the mobile terminal 50, it is possible to hide a service interruption to a user at an application level operating in the mobile terminal 50.

The determination processing by the relocation determination section 312 of the MME 302 is similar to the determination processing described in FIGS. 7 and 8, and therefore a description thereof will be omitted.

2.3) Effects

As described above, according to the second exemplary embodiment of the present invention, the radio base station 601a to which the mobile terminal 50 connects to before movement collects and stores communication use states with respect to the mobile terminal 50, and before relocation is started, the MME 302 determines whether or not to perform relocation, based on the importance of a bearer and the use state thereof. Thereby, as in the first exemplary embodiment, it is possible to avoid a service interruption during an important communication such as voice conversation or live streaming, and it is possible to suppress degradation of a user's sensory feeling about reception of a service.

Moreover, since it is possible to consider the importance of a communication that a mobile terminal is performing and the use state thereof when determining whether or not to perform relocation processing, it is possible to perform relocation at an appropriate timing, such as, for example, to perform relocation only when a best-effort communication is being performed.

Furthermore, according to the present exemplary embodiment, since a radio base station collects the use states of bearers, there is an advantage that concentration of processing can be avoided better than in the case where an access network GW collects.

3. Third Exemplary Embodiment 3.1) System Structure

A third exemplary embodiment of the present invention is different from the above-described first and second exemplary embodiments in that a MME acquires the use states of bearers from a packet network GW.

Figure 11:
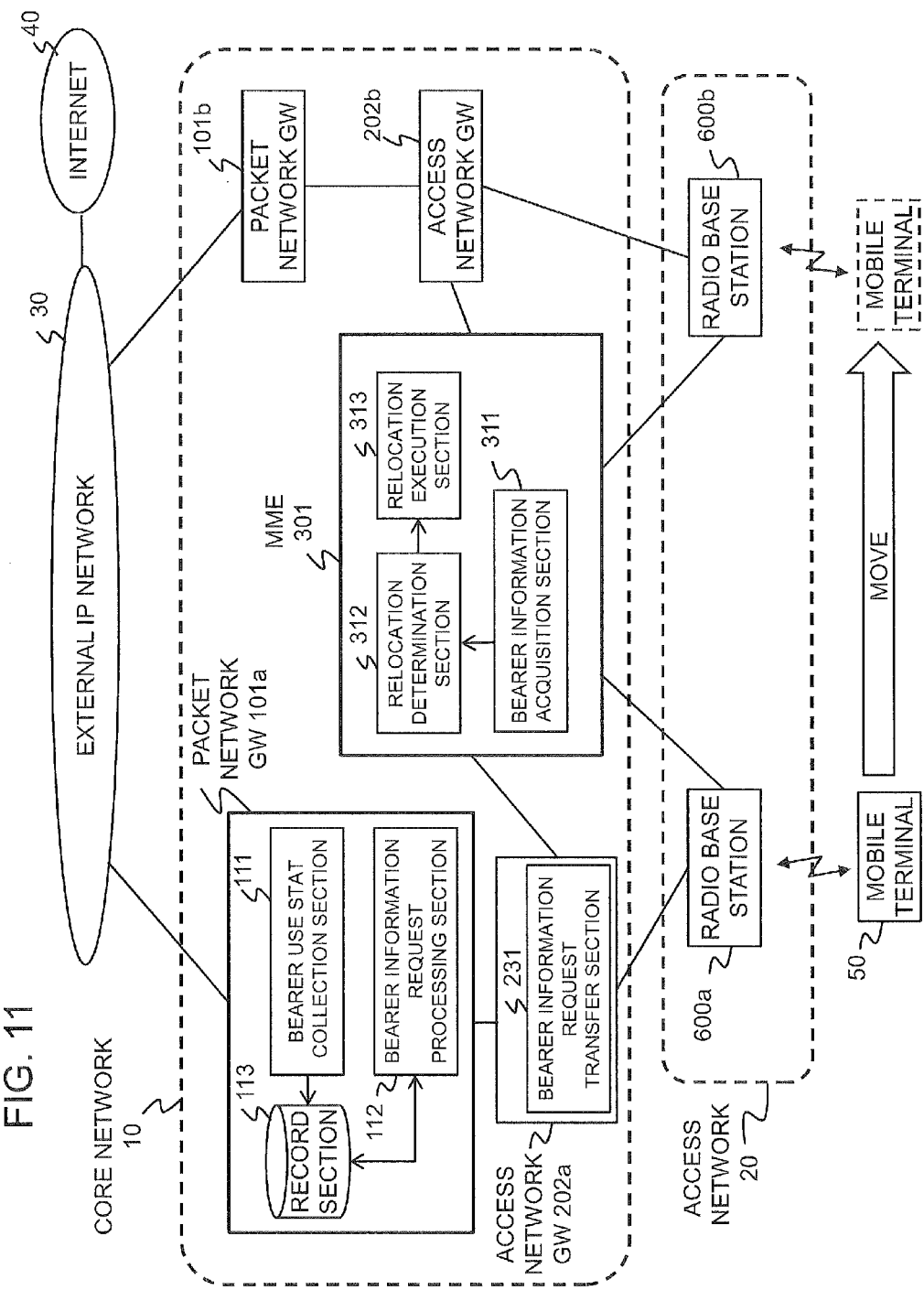
FIG. 11 is a schematic diagram of a mobile communication system in which a relocation control device according to a third exemplary embodiment of the present invention is installed.

Referring to FIG. 11, a packet network GW (101a, 101b) is configured by including a bearer use state collection section 111, a bearer information request processing section 112, and a record section 113, in addition to functionality an ordinary packet network GW 100 has. Since the bearer use state collection section 111, the bearer information request processing section 112, and the record section 113 correspond to the bearer use state collection section 211, the bearer information request processing section 212, and the record section 213 in FIG. 4, respectively, and have similar functions thereto, a detailed description thereof will be omitted.

An access network GW (202a, 202b) has functionality an ordinary access network GW 200 has, but further includes a function of a bearer information request transfer section 231 in the present exemplary embodiment.

A MME 301 has functions including a bearer information acquisition section 311, a relocation determination section 312, and a relocation execution section 313, in addition to control functionality an existing MME has, and their basic functionality is similar to that of the MME 301 shown in FIG. 4 except that target nodes are different that a bearer information request signal is sent to and a bearer information response signal is received from. Therefore, they are denoted by the same reference signs and a description thereof will be omitted.

3.2) Relocation Control

The MME 301 in the present exemplary embodiment is different from the MME 301 in the first and second exemplary embodiments in that bearer information is acquired from the packet network GW 101a via the access network GW 202a.

Figure 12:
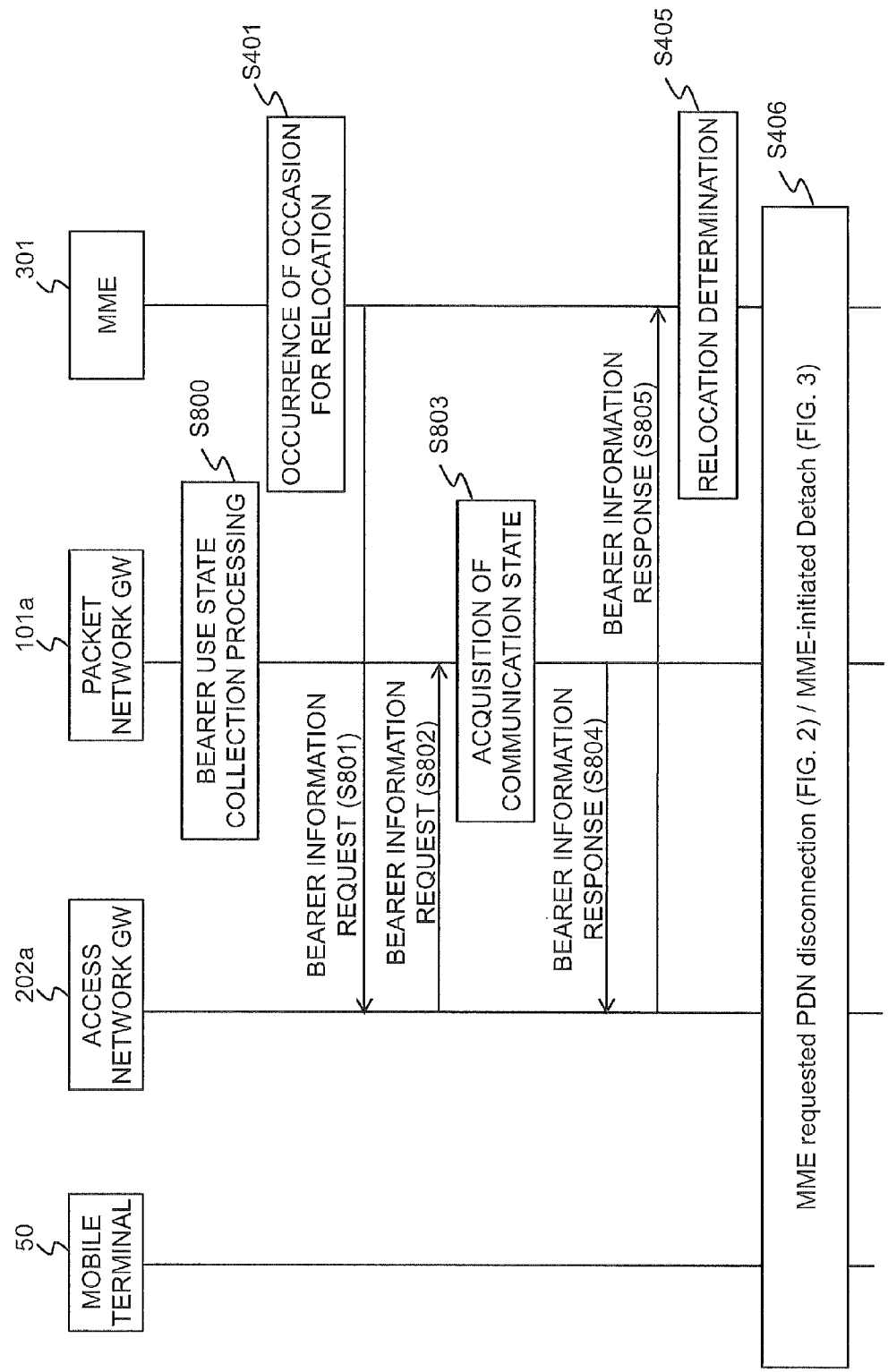
FIG. 12 is a sequence diagram showing a relocation control method according to the third exemplary embodiment.

Referring to FIG. 12, the bearer use state collection section 111 of the packet network GW 101a periodically, or at a timing of detecting a packet, records communication state information in the record section 113, associating it with a terminal identifier of a mobile terminal 50 and a bearer identifier (Step S800).

When the packet network GW 100b that is more suitable to the mobile terminal 50 is detected on the occasion of TAU reception or the like caused by a movement of the mobile terminal 50 or the like, the MME 301 starts a process for determining whether or not to perform packet network GW relocation (Step S401).

First, the bearer information acquisition section 311 sends a bearer information request to the access network GW 202a to acquire bearer information on the mobile terminal 50 from the packet network GW 101a (Step S801), and the bearer information request transfer section 231 of the access network GW 202a transfers this bearer information request to the destination packet network GW 101a (Step S802). In this event, in case where the access network. GW 202a and the packet network GW 101a use different protocols, the bearer information request is not transferred as it is but may be sent after its signal format is appropriately converted.

In the bearer information request, stored are the identifier of the mobile terminal 50 and the identifier(s) of one or a plurality of bearers established between the mobile terminal 50 and the packet network GW 101*a*. However, as described earlier, only the identifier of the mobile terminal 50 may be stored, or other information may also be stored to identify communication state information in smaller granularity. Having sent the bearer information request, the bearer information acquisition section 311 waits for a response from the packet network GW 101*a*.

The bearer information request processing section 112 of the packet network GW 101*a*, upon receiving the bearer information request, searches the communication state information table recorded in the record section 113 by using the terminal identifier and the bearer identifiers stored in the bearer information request, and acquires corresponding communication state information (Step S803). Upon acquiring the communication state information on each bearer established by the mobile terminal 50, the bearer information request processing section 112 stores the communication state information in a bearer information response and sends it back to the access network GW 202*a*, with its destination addressed to the MME 301 (Step S804). The bearer information request transfer section 231 of the access network GW 202*a* transfers this bearer information response to the destination MME 301 (Step S805). In this event as well, in case where the access network GW 202*a* and the packet network GW 101*a* use different protocols, the bearer information response is not transferred as it is but may be sent after its signal format is appropriately converted.

Upon receiving the bearer information response, the bearer information acquisition section 311 of the MME 301 outputs the communication state information on each bearer established by the mobile terminal 50 to the relocation determination section 312, and the relocation determination section 312 determines whether or not to perform relocation (Step 405). In case where packet network GW relocation is performed, the relocation execution section 313 performs relocation from the packet network GW 101*a* to the packet network GW 101*b* through the MME requested PDN disconnection procedure shown in FIG. 2 or the MME-initiated Detach procedure shown in FIG. 3 (Step 406). In this event, as described above, if a notification of a temporary bearer loss intended for relocation can be made to the mobile terminal 50, it is possible to hide a service interruption to a user at an application level operating in the mobile terminal 50.

The determination processing by the relocation determination section 312 of the MME 301 is similar to the determination processing described in FIGS. 7 and 8, and therefore a description thereof will be omitted.

As described above, according to the present exemplary embodiment, a party to exchange the bearer information request signal and the bearer information response signal with is the packet network GW 101*a* via the access network GW 202*a*. It may depends on an operator of a mobile network which one of the access network GW 202*a* and the packet network GW 101*a* is selected to be the destination of the bearer information request signal. However, considering that an interface between a MME and a packet network GW is not defined in the 3GPP standardization, it can be said to be more applicable that the MME 301 sends the bearer information request signal to the access network GW 202*a*, which then sends the signal to the packet network GW 101*a* after converting the signal format as necessary.

3.3) Effects

As described above, according to the third exemplary embodiment of the present invention, the access network GW 201*a* which is the source of relocation collects communication use states with respect to the mobile terminal 50, and before relocation is started, the MME 301 determines whether or not to perform relocation, based on the importance of a bearer and the use state thereof. Thereby, it is possible to avoid a service interruption during an important communication such as voice conversation or live streaming, and it is possible to suppress degradation of a user's sensory feeling about reception of a service.

Moreover, since it is possible to consider the importance of a communication that a mobile terminal is performing and the use state thereof when determining whether or not to perform relocation processing, it is possible to perform relocation at an appropriate timing, such as, for example, to perform relocation only when a best-effort communication is being performed.

Furthermore, according to the present exemplary embodiment, there is an advantage that it is easy to make a change to facility because relocation can be controlled by a packet network GW and a MME within the core network 10 and it is unnecessary to change a node in the access network 20.

4. Fourth Exemplary Embodiment 4.1) System Structure

A fourth exemplary embodiment of the present invention is different from the above-described third exemplary embodiment in that a MME acquires the use states of bearers directly from a packet network GW, not via an access network GW.

Figure 13:
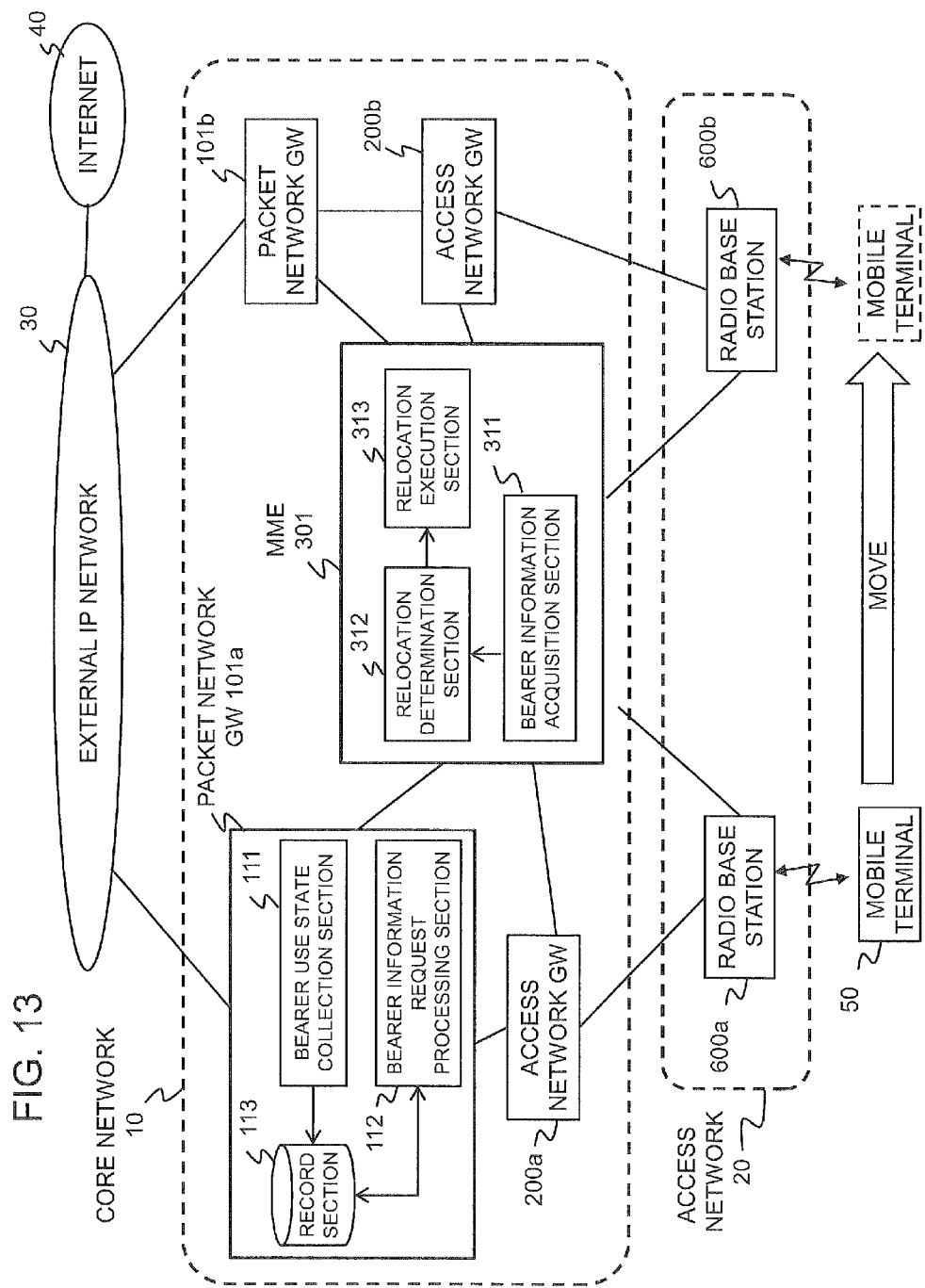
FIG. 13 is a schematic diagram of a mobile communication system in which a relocation control device according to a fourth exemplary embodiment of the present invention is installed.

As shown in FIG. 13, a packet network GW (101*a*, 101*b*) is the same as the packet network GW in the third exemplary embodiment, while an access network GW (200*a*, 200*b*) has the functionality of an ordinary access network GW, with the bearer information request transfer function not required. Moreover, a MME 301 has functions including a bearer information acquisition section 311, a relocation determination section 312, and a relocation execution section 313, in addition to control functionality an existing MME has, and their basic functionality is similar to that of the MME 301 shown in FIG. 4 except that target nodes are different that a bearer information request signal is sent to and a bearer information response signal is received from. Therefore, they are denoted by the same reference signs and a description thereof will be omitted.

4.2) Relocation Control

The MME 301 in the present exemplary embodiment is different from the MME 301 in the third exemplary embodiment in that bearer information is acquired directly from the packet network GW 101*a*.

Referring to FIG. 14, the bearer use state collection section 111 of the packet network GW 101*a* periodically, or at a timing of detecting a packet, records communication state information in the record section 113, associating it with a terminal identifier of a mobile terminal 50 and a bearer identifier (Step S900).

When the packet network GW 100*b* that is more suitable to the mobile terminal 50 is detected on the occasion of TAU reception or the like caused by a movement of the mobile terminal 50 or the like, the MME 301 starts a process for determining whether or not to perform packet network GW relocation (Step S401).

First, the bearer information acquisition section 311 sends a bearer information request to the packet network GW 101*a* (Step S901). In the bearer information request, stored are the identifier of the mobile terminal 50 and the identifier(s) of one or a plurality of bearers established between the mobile terminal 50 and the packet network GW 101*a*. However, as described earlier, only the identifier of the mobile terminal 50 may be stored, or other information may also be stored to identify communication state information in smaller granularity. Having sent the bearer information request, the bearer information acquisition section 311 waits for a response from the packet network GW 101*a*.

The bearer information request processing section 112 of the packet network GW 101*a*, upon receiving the bearer information request, searches the communication state information table recorded in the record section 113 by using the terminal identifier and the bearer identifiers stored in the bearer information request, and acquires corresponding communication state information (Step S902). Upon acquiring the communication state information on each bearer established by the mobile terminal 50, the bearer information request processing section 112 stores the communication state information in a bearer information response and sends it back to the MME 301 (Step S903).

Upon receiving the bearer information response, the bearer information acquisition section 311 of the MME 301 outputs the communication state information on each bearer established by the mobile terminal 50 to the relocation determination section 312, and the relocation determination section 312 determines whether or not to perform relocation (Step 405). In case where packet network GW relocation is performed, the relocation execution section 313 performs relocation from the packet network GW 101*a* to the packet network GW 101*b* through the MME requested PDN disconnection procedure shown in FIG. 2 or the MME-initiated Detach procedure shown in FIG. 3 (Step 406). In this event, as described above, if a notification of a temporary bearer loss intended for relocation can be made to the mobile terminal 50, it is possible to hide a service interruption to a user at an application level operating in the mobile terminal 50.

The determination processing by the relocation determination section 312 of the MME 301 is similar to the determination processing described in FIGS. 7 and 8, and therefore a description thereof will be omitted.

4.3) Effects

As described above, according to the fourth exemplary embodiment of the present invention, the access network GW 201*a* which is the source of relocation collects communication use states with respect to the mobile terminal 50, and before relocation is started, the MME 301 determines whether or not to perform relocation, based on the importance of a bearer and the use state thereof. Thereby, it is possible to avoid a service interruption during an important communication such as voice conversation or live streaming, and it is possible to suppress degradation of a user's sensory feeling about reception of a service.

Moreover, since it is possible to consider the importance of a communication that a mobile terminal is performing and the use state thereof when determining whether or not to perform relocation processing, it is possible to perform relocation at an appropriate timing, such as, for example, to perform relocation only when a best-effort communication is being performed.

Furthermore, the present exemplary embodiment also has the advantage that loads on an access network GW can be reduced, in addition to the advantage that it is easy to make a change to facility because relocation can be controlled by a packet network GW and a MME within the core network 10 and it is unnecessary to change a node in the access network 20.

5. Other Embodiments

The record sections 213, 613, and 113 for the use states of bearers in the above-described respective exemplary embodiments can be implemented by a device that can record information, such as, for example, a semiconductor memory or a hard disk drive. The other functional blocks can be implemented by software and a CPU to cause it to operate, or by hardware.

Correspondences between individual nodes in each of the above-described exemplary embodiments and nodes defined in 3GPP are as follows. The packet network GW corresponds to Packet Data Network Gateway (PDN GW) or GGSN (Gateway GPRS General Packet Radio Service) Support Node). The access network GW corresponds to Serving Gateway (S-GW) or SGSN (Serving GPRS Support Node). The mobility management node (MME) corresponds to MME (Mobility Management Entity) defined in 3GPP. The radio base station corresponds to eNodeB (enhanced NodeB) or a set of RNC (Radio Network Controller) and NodeB.

6. Additional Statements

Part or all of the above-described exemplary embodiments also can be stated as in, but is not limited to, the following additional statements.

(Additional Statement 1)

A relocation control device for controlling relocation of a packet network gateway that provides functionality as an anchor for ensuring mobility of a mobile terminal in a mobile communication system, characterized by comprising:

information acquisition means for, when an occasion for relocation arises, acquiring communication state information to obtain importance and a use state of a communication between the mobile terminal and the packet network gateway; and relocation determination means for determining whether or not to perform the relocation, based on the importance and the use state of the communication.

(Additional Statement 2)

The relocation control device according to additional statement 1, characterized in that the information acquisition means determines the importance of the communication, based on a communication quality profile assigned to one or more logical data paths established between the mobile terminal and the packet network gateway.

(Additional Statement 3)

The relocation control device according to additional statement 1 or 2, characterized in that the information acquisition means acquires the communication state information from a node located on the logical data paths.

(Additional Statement 4)

The relocation control device according to additional statement 3, characterized in that the node located on the logical data paths is any one of an access network gateway, a radio base station, and the packet network gateway in the mobile communication system.

(Additional Statement 5)

The relocation control device according to any one of additional statements 1 to 4, characterized in that the relocation determination means selects a communication for which a communication interruption should be avoided, as an important communication.

(Additional Statement 6)

The relocation control device according to any one of additional statements 1 to 5, characterized in that the mobile communication system is EPS (Evolved Packet System) standardized in 3GPP (Third Generation Partnership Projection).

(Additional Statement 7)

A method for controlling relocation of a packet network gateway that provides functionality as an anchor for ensuring mobility of a mobile terminal in a mobile communication system, characterized in that a mobility management node in the mobile communication system, when an occasion for relocation arises, determines whether or not to perform the relocation, based on importance and a use state of a communication between the mobile terminal and the packet network gateway.

(Additional Statement 8)

The method for controlling relocation according to additional statement 7, characterized in that the mobility management node determines the importance of the communication, referring to a communication quality profile assigned to one or more logical data paths established between the mobile terminal and the packet network gateway.

(Additional Statement 9)

The method for controlling relocation according to additional statement 8, characterized in that the mobility management node acquires communication state information on the one or more logical data paths from a node located on the logical data paths.

(Additional Statement 10)

The method for controlling relocation according to additional statement 3, characterized in that the node located on the logical data paths is any one of an access network gateway, a radio base station, and the packet network gateway in the mobile communication system.

(Additional Statement 11)

The method for controlling relocation according to any one of additional statements 7 to 10, characterized in that the mobility management node selects a communication for which a communication interruption should be avoided, as an important communication.

(Additional Statement 12)

The method for controlling relocation according to any one of additional statements 7 to 11, characterized in that the mobile communication system is EPS (Evolved Packet System) standardized in 3GPP (Third Generation Partnership Projection).

(Additional Statement 13)

A mobility management node including the relocation control device according to any one of additional statements 1 to 6.

(Additional Statement 14)

A mobile communication system including the mobile management node according to additional statement 13.

(Additional Statement 15)

An access network gateway in the mobile communication system according to additional statement 14, characterized by comprising:

communication state collection means for collecting the communication state information periodically or at a timing of detecting a packet;

storage means for storing the communication state information in a predetermined format; and request processing means for sending the communication state information in response to a request from the information acquisition means.

(Additional Statement 16)

A packet network gateway in the mobile communication system according to additional statement 14, characterized by comprising:

communication state collection means for collecting the communication state information periodically or at a timing of detecting a packet;

storage means for storing the communication state information in a predetermined format; and request processing means for sending the communication state information in response to a request from the information acquisition means.

(Additional Statement 17)

A radio base station in the mobile communication system according to additional statement 14, characterized by comprising:

communication state collection means for collecting the communication state information periodically or at a timing of detecting a packet;

storage means for storing the communication state information in a predetermined format; and request processing means for sending the communication state information in response to a request from the information acquisition means.

(Additional Statement 18)

A program causing a program-controlled processor to function so as to control relocation of a packet network gateway that provides functionality as an anchor for ensuring mobility of a mobile terminal in a mobile communication system, characterized by causing the program-controlled processor to function so as to have:

information acquisition means, when an occasion for relocation arises, acquire communication state information to obtain importance and a use state of a communication between the mobile terminal and the packet network gateway; and relocation determination means determine whether or not to perform the relocation, based on the importance and the use state (Additional Statement 19)

The program according to additional statement 14, characterized in that the information acquisition means determines the importance of the communication, based on a communication quality profile assigned to one or more logical data paths established between the mobile terminal and the packet network gateway.

(Additional Statement 20)

The program according to additional statement 18 or 19, characterized in that the information acquisition means acquires the communication state information from a node located on the logical data paths.

(Additional Statement 21)

The program according to additional statement 20, characterized in that the node located on the logical data paths is any one of an access network gateway, a radio base station, and the packet network gateway in the mobile communication system.

(Additional Statement 22)

The program according to any one of additional statements 18 to 21, characterized in that the relocation determination means selects a communication for which a communication interruption should be avoided, as an important communication.

INDUSTRIAL APPLICABILITY

The present invention is applicable to various applications (services) using a mobile communication system complying with the 3GPP standards.

REFERENCE SIGNS LIST

10 Core network
20 Access network
30 External IP network
40 Internet
50 Mobile terminal
100, 101a, 101b Packet network GW
111 Bearer use state collection section
112 Bearer information request processing section
113 Record section
200, 201a, 201b Access network GW
211 Bearer use state collection section
212 Bearer information request processing section
213 Record section
231 Bearer information request transfer section
300, 301 MME
311 Bearer information acquisition section
312 Relocation determination section
313 Relocation execution section
400 HSS
500 Local GW
600, 601a, 601b Radio base station
611 Bearer use state collection section
612 Bearer information request processing section
613 Record section

What is claimed is:

1. A device which is included in a control-plane node in a mobile communication system of control-plane and user-plane splitting, comprising:
a transceiver that communicates with at least one user-plane node; and
at least one processor configured to execute a set of instructions, comprising:
when an occasion for relocation arises, send a request for communication state information to a user-plane node through which a user data communication between a mobile terminal and a packet network gateway that is an anchor for ensuring mobility of the mobile terminal is made;
acquire the communication state information of the user data communication from a response to the request;
determine whether the user data communication is being used as an important communication, based on a use state of the user data communication obtained from the communication state information; and
determine whether or not to perform the relocation of a functionality of the packet network gateway to another packet network gateway, depending on whether the user data communication is being used as the important communication.

2. The device according to claim 1, wherein the at least one processor is configured to determine the importance of the user data communication, based on a communication quality profile assigned to one or more logical data paths established between the mobile terminal and the packet network gateway.

3. The device according to claim 1, wherein the at least one processor is configured to acquire the communication state information from a user-plane node located on one or more logical data paths established between the mobile terminal and the packet network gateway.

4. The device according to claim 3, wherein the user-plane node located on the one or more logical data paths is any one of an access network gateway, a radio base station, and the packet network gateway in the mobile communication system.

5. The device according to claim 1, wherein the at least one processor is configured to select the user data communication for which a communication interruption should be avoided, as an important user data communication.

6. The device according to claim 1, wherein the mobile communication system is EPS (Evolved Packet System) standardized in 3GPP (Third Generation Partnership Projection).

7. The device according to claim 1, wherein the at least one processor is configured to determine not to perform the relocation when the importance of the user data communication in use is greater than a predetermined value.

8. A mobility management node including the device according to claim 1.

9. A mobile communication system including the mobile management node according to claim 8.

10. A method for relocation control in a mobile communication system of control-plane and user-plane splitting, comprising:
at a mobility management node in the mobile communication system,
when an occasion for relocation arises, sending a request for communication state information to a user-plane node through which a user data communication between a mobile terminal and a packet network gateway that is an anchor for ensuring mobility of the mobile terminal is made;
acquiring the communication state information of the user data communication from a response to the request;
determining whether the user data communication is being used as an important communication, based on a use state of the user data communication obtained from the communication state information; and
determining whether or not to perform the relocation of a functionality of the packet network gateway to another packet network gateway, depending on whether the user data communication is being used as the important communication.

11. The method for controlling relocation according to claim 10, wherein the mobility management node determines the importance of the user data communication, referring to a communication quality profile assigned to one or more logical data paths established between the mobile terminal and the packet network gateway.

12. The method for controlling relocation according to claim 10, wherein the mobility management node acquires communication state information on one or more logical data paths established between the mobile terminal and the packet network gateway, from a node located on the one or more logical data paths.

13. The method for controlling relocation according to claim 12, wherein the node located on the one or more logical data paths is any one of an access network gateway, a radio base station, and the packet network gateway in the mobile communication system.

14. The method for controlling relocation according to claim 10, wherein the mobility management node selects the user data communication for which a communication interruption should be avoided, as an important user data communication.

15. The method for controlling relocation according to claim 10, wherein the mobile communication system is EPS (Evolved Packet System) standardized in 3GPP (Third Generation Partnership Projection).

16. The method according to claim 10, wherein when the importance of the user data communication in use is greater than a predetermined value, it is determined that the relocation is not performed.

17. An access network gateway in the mobile communication node according to claim 9, comprising:
a transceiver that communicates with at least one user-plane node and the mobile management node; and
at least one processor configured to execute a set of instructions to:
collect the communication state information periodically or at a timing of detecting a packet;
store the communication state information in a predetermined format; and
send the communication state information in response to a request from the information acquisition unit.

18. A packet network gateway in the mobile communication system according to claim 9, comprising:
a transceiver that communicates with at least one user-plane node; and
at least one processor configured to execute a set of instructions to:
collect the communication state information periodically or at a timing of detecting a packet;
store the communication state information in a predetermined format; and
send the communication state information in response to a request from the information acquisition unit.

19. A radio base station in the mobile communication system according to claim 9, comprising:
a transceiver that communicates with at least one user-plane node and the mobile management node; and
at least one processor configured to execute a set of instructions to:
collect the communication state information periodically or at a timing of detecting a packet;
store the communication state information in a predetermined format; and
send the communication state information in response to a request from the information acquisition unit.

20. A non-transitory computer readable comprising a program, causing a program-controlled processor to function so as to control relocation in a mobile communication system of control-plane and user-plane splitting, the program causing the program-controlled processor to perform functions of, comprising:
when an occasion for relocation arises, sending a request for communication state information to a user-plane node through which a user data communication between a mobile terminal and a packet network gateway that is an anchor for ensuring mobility of the mobile terminal is made;
acquiring the communication state information of the user data communication from a response to the request;
determinig whether the user data communication is being used as an important communication, based on a use state of the user data communication obtained from the communication state information; and
determining whether or not to perform the relocation of a functionality of the packet network gateway to another packet network gateway, depending on whether the user data communication is being used as the important communication.

21. The non-transitory computer readable according to claim 20, wherein the importance of the user data communication is determined based on a communication quality profile assigned to one or more logical data paths established between the mobile terminal and the packet network gateway.

22. The non-transitory computer readable according to claim 20, wherein the communication state information is acquired from a node located on one or more logical data paths established between the mobile terminal and the packet network gateway.

23. The program according to claim 20, wherein when the importance of the user data communication in use is greater than a predetermined value, it is determined that the relocation is not performed.

* * * * *